US006975360B2

(12) United States Patent  
Slatter

(10) Patent No.: US 6,975,360 B2  
(45) Date of Patent: Dec. 13, 2005

(54) IMAGE DETECTOR METHOD AND APPARATUS INCLUDING PLURAL DETECTOR REGIONS AND IMAGE ILLUMINATORS

(75) Inventor: David Neil Slatter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 908 days.

(21) Appl. No.: 09/726,395

(22) Filed: Dec. 1, 2000

(65) Prior Publication Data

US 2001/0002850 A1 Jun. 7, 2001

(30) Foreign Application Priority Data

Dec. 3, 1999 (GB) .............................. 9928479

(51) Int. Cl.[7] .................. H04N 5/225; H04N 5/222
(52) U.S. Cl. .................. 348/370; 348/373; 348/218.1
(58) Field of Search .................. 348/218.1, 370, 348/373, 371, 296, 317; 358/906, 450, 474, 483

(56) References Cited

U.S. PATENT DOCUMENTS

| 4,888,644 | A | * | 12/1989 | Wilson ..................... 348/371 |
| 4,926,058 | A | | 5/1990 | Iwamoto et al. ......... 250/578.1 |
| 5,093,763 | A | * | 3/1992 | Vanderschuit et al. ........ 362/18 |
| 5,430,481 | A | * | 7/1995 | Hynecek ..................... 348/317 |
| 5,452,004 | A | * | 9/1995 | Roberts ..................... 348/301 |
| 5,550,641 | A | * | 8/1996 | Shashua et al. ............. 386/128 |
| 6,088,612 | A | | 7/2000 | Blair ......................... 600/407 |
| 6,633,338 | B1 | * | 10/2003 | Pelsue et al. ............... 348/370 |
| 6,650,442 | B1 | * | 11/2003 | Chiu ........................ 358/474 |

OTHER PUBLICATIONS

First page—WINDOWS, Document: JP11155124.

First page—WINDOWS, Document: JP10051727.

* cited by examiner

*Primary Examiner*—Wendy R. Garber  
*Assistant Examiner*—Timothy J Henn

(57) ABSTRACT

A digital camera has first and second light sources for sequentially illuminating a document from two different directions in response to the camera being activated. The camera has first and second sensor portions. Only the first and second sensor portions respectively respond to images reflected from the document in response to the first and second sources illuminating the document. Images detected by the first and second sensor portions are combined to remove specular reflection from the document image. In a second embodiment, the camera has three sensor portions.

44 Claims, 7 Drawing Sheets

IMAGE DETECTOR METHOD AND APPARATUS INCLUDING PLURAL DETECTOR REGIONS AND IMAGE ILLUMINATORS

FIELD OF THE INVENTION

The present invention relates to digital camera, and particularly although not exclusively, to a digital camera configured to obtain an image of a document.

BACKGROUND TO THE INVENTION

Digital cameras are known in the prior art and in their simplest form comprise a light, typically a flash light, a sensor containing image sensitive nodes and image storage nodes, a lens or series of lenses and a memory bank. The digital camera is known to be employed as an image capture device for capturing images of documents, and in operation is held in a fixed position over a document. The flash light is then triggered thus illuminating the document. The lens serves to focus the image onto the light sensitive nodes and the image is transferred to light storage nodes within the sensor. The final image is read out to a suitable memory bank where it is stored indefinitely awaiting a final process, for example, downloading onto a computer hard-drive or floppy disk.

However, a digital camera employed in this manner as a document image capture device has severe limitations due to the phenomena of specular reflections. Typically, most documents consist of a glossy material, which reflects light to a large extent. When the flashlight of the digital camera is triggered, high energy specular reflected light is incident on the light sensitive nodes of the sensor resulting, ultimately, in a glare spot within the final image, this glare spot effectively masking certain features of the document.

The problem of glare spots has been recognised in a different field (medical imaging—imaging of the cervix for detection of cervical cancer). U.S. Pat. No. 6,088,612 proposes a solution in which two light sources are used, and the glare-affected parts of an image taken with one light source are replaced by the glare-free parts of the image taken with the other light source. However, obtaining two complete document images containing the two glare spots, requires the camera to receive, process and store twice as much information as would be required if only one image was obtained. This process for irradiating glare spots in this manner is therefore a relatively expensive process in terms of data storage capacity and processing time.

SUMMARY OF THE INVENTION

According to first aspect of the present invention there is provided a digital camera configured to obtain an image of a document, said camera comprising:

first illumination means for illuminating said document in a first image capture operation of said camera;

second illumination means for illuminating said document in a second image capture operation of said camera;

image sensing means for capturing an image of said document from said first and second image capture operations, said sensing means arranged in first and second portions;

control means for controlling said sensing means, said control means being configured to collect an image of a first portion of said illuminated document during said first image capture operation said first image capture operation thereby resulting in a first image data, and said control means being configured to collect an image of a second portion of said illuminated document during said second image capture operation said second image capture operation thereby resulting in a second image data;

means for storing said first and second image data; and means for processing said first and second image data so as to obtain a final image data of said document produced from said first and second image data.

Preferably said first portion of said sensing means and said second portion of said sensing means constitute part of an integrated image sensing unit, said unit further comprising a first portion of said storage means and a second portion of storage means.

A said first portion of said sensing means may be coupled to a portion of said storage means specifically allocated to said first sensing means portion.

Said camera may be configured to capture substantially half of said document image in said first image capture operation and capture substantially half of said document image in said second image capture operation.

Preferably the camera comprises at least one lens wherein illumination from said illuminated document passes through at least one lens prior to being received by said sensing means.

Suitably, the sensing means are positioned substantially above said at least one lens.

Preferably said sensing means comprises an array of light sensitive elements arranged for exposure to illumination from said documents;

said control means comprises an array of gating means, for gating charge collected by said array of light sensitive elements; and said storage means comprises an array of charge storage elements arranged to receive a plurality of charges from said array of light sensitive elements, via said gating means.

Said image sensing means may comprise:

an array of individual image sensing elements;

said control means may comprise an array of individual control elements; and said storage means may comprise an array of individual storage elements, wherein each said image sensing element has a corresponding respective said control element and a corresponding respective said storage element, the arrangement being that each said image sensing element accumulates charge in response to illumination, and said charge is controlled by said corresponding respective control element to be supplied to said corresponding respective storage element, or to be discharged from said image sensing element other than to said storage element.

Said portions of said sensing means may be configurable for use independently.

Said control means may be substantially integrated with said sensing means, said storage means, and said first and second illumination means.

Said camera preferably comprises means for enabling said camera to be maintained in a fixed position above said document.

Preferably said control means may be configurable for use in producing a predetermined delay between said first image capture operation and said second image capture operation.

Said control means may be configurable for use in producing a said first illumination of said document and a said second illumination of said document consecutively, one after the other.

Preferably said sensing means is integrated directly to a storage unit or memory bank of the camera.

Said first illumination means and said second illumination means may be positioned diametrically opposite each other on a circle, and comprising at least one lens positioned at the centre of said circle.

Said camera may comprise means for attaching said camera to a support body, said support body being able to maintain said camera over said document in a substantially fixed position relative to a said document.

According to second aspect of the present invention there is provided a method of obtaining an image of a document using a digital camera, said method comprising the steps of:

illuminating the document in a first image capture operation of said camera;

illuminating the document in a second image capture operation of said camera;

using an image sensing means to capture an image of said document from said image capture operations;

during said image capture, controlling said image sensing means in accordance with the steps of:

exposing a first portion of said image sensing means to said illuminated document during a first image capture operation said first image capture operation thereby resulting in a first image data;

exposing a second portion of said sensing means to said illuminated document during a second image capture operation said second image capture operation thereby resulting in a second image data;

storing said first and second image data; and processing said first and second image data so as to obtain a final image of said document produced from said first and second image data.

During said step of image capture, controlling said sensing means may comprise the steps of:

exposing a first portion and a second portion of the sensing means to said illuminated document during said first image capture operation said first image capture operation thereby resulting in a first image;

exposing said second portion and said third portion of said sensing means to said illuminated document during said second image capture operation said second image capture operation thereby resulting in a second image, said first and second image capture operations resulting in a third image;

storing said first, second and third images; and processing said first and second images so as to obtain a final image of said document.

Said method may further comprise the steps of:

following said first image capture operation, transferring said first image from said first sensing means to a suitable first storage means; and following said second image capture operation, transferring said second image from said second sensing means to a suitable second storage means; and processing said first and second images so as to obtain a final image of said document.

Said method may further comprise the steps of:

following said first image capture operation, transferring said first image from said first portion of said sensing means to a suitable first storage means;

following said second image capture operation, transferring said second image from said second portion of said sensing means to a suitable second storage means;

transferring said third image from said third portion of said sensing means to a suitable third storage means; and processing said first, second and third images so as to obtain a final image of said document.

The invention includes a digital imaging apparatus configured to obtain an image of a document, said imaging apparatus comprising a digital camera and a stand adapted to hold said digital camera in a fixed orientation relative to said document, said digital camera comprising:

first illumination means for illuminating said document in a first image capture operation;

image sensing means for capturing an image of said document from said first image capture operation, and a second image capture operation, said sensing means arranged in first and second portions;

control means for controlling said sensing means, said control means being configured to collect an image of a first portion of said illuminated document during said first image capture operation, said first image capture operation thereby resulting in a first image data, and said control means being configured to collect an image of a second portion of said illuminated document during said second image capture operation, said second image capture operation thereby resulting in a second image data;

means for storing said first and second image data; and means for processing said first and second image data so as to obtain a final image data of said document produced from said first and second image data;

said stand comprising:

a second illumination means for illuminating said document in said second image capture operation, wherein said control means is arranged to activate said first and second illumination means for illumination of said first and second sensor portions.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
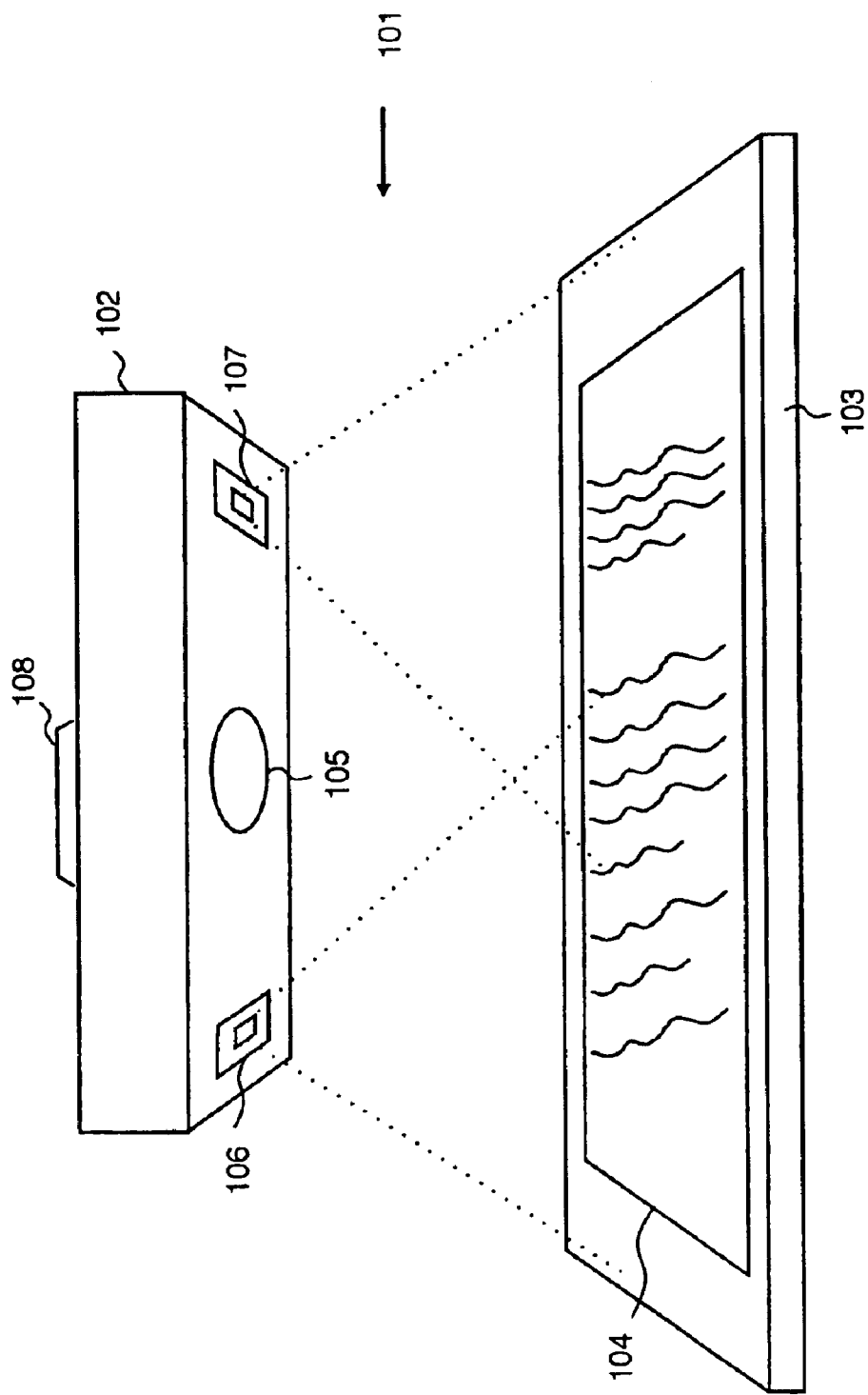
FIG. 1 shows a digital camera suspended vertically above a document, the document resting on a flat surface.

FIG. 1 illustrates a prior art photography system 101 including digital camera positioned vertically above a document 104 resting on a flat surface 103. The digital camera 102, comprises a lens 105 located substantially central on the lower face of the digital camera 102. Also present on the lower surface of the digital camera 102, placed diametrically opposite on a circle with the lens 105 at the center of the circle, is a first light source 106 and a second light source 107. The digital camera 102 further comprises a sensing and storing unit 108 positioned directly above the lens 105. Placed directly below the digital camera 102 is a document 104 residing on a flat surface 103. In operation, light source 106 is triggered thus illuminating the document 104, the reflected illumination from the illuminated document is focused by the lens onto the sensing and storing unit 108 within the digital camera 102. In so doing a glare spot is produced in this first image. The second light source 107 is then triggered illuminating the document a second time, this second reflected illumination from the illuminated document is then focused by the lens 105 onto the sensing and storage unit 108 within the digital camera 102. A second glare spot is then produced in this second image, this second glare spot being in a different position from the first glare spot. The images resulting from the initial triggering of light source 106 and light source 107 are then processed and combined, effectively eliminating the different glare spots contained in each first and second image captured, resulting in a final complete document image.

Figure 2:
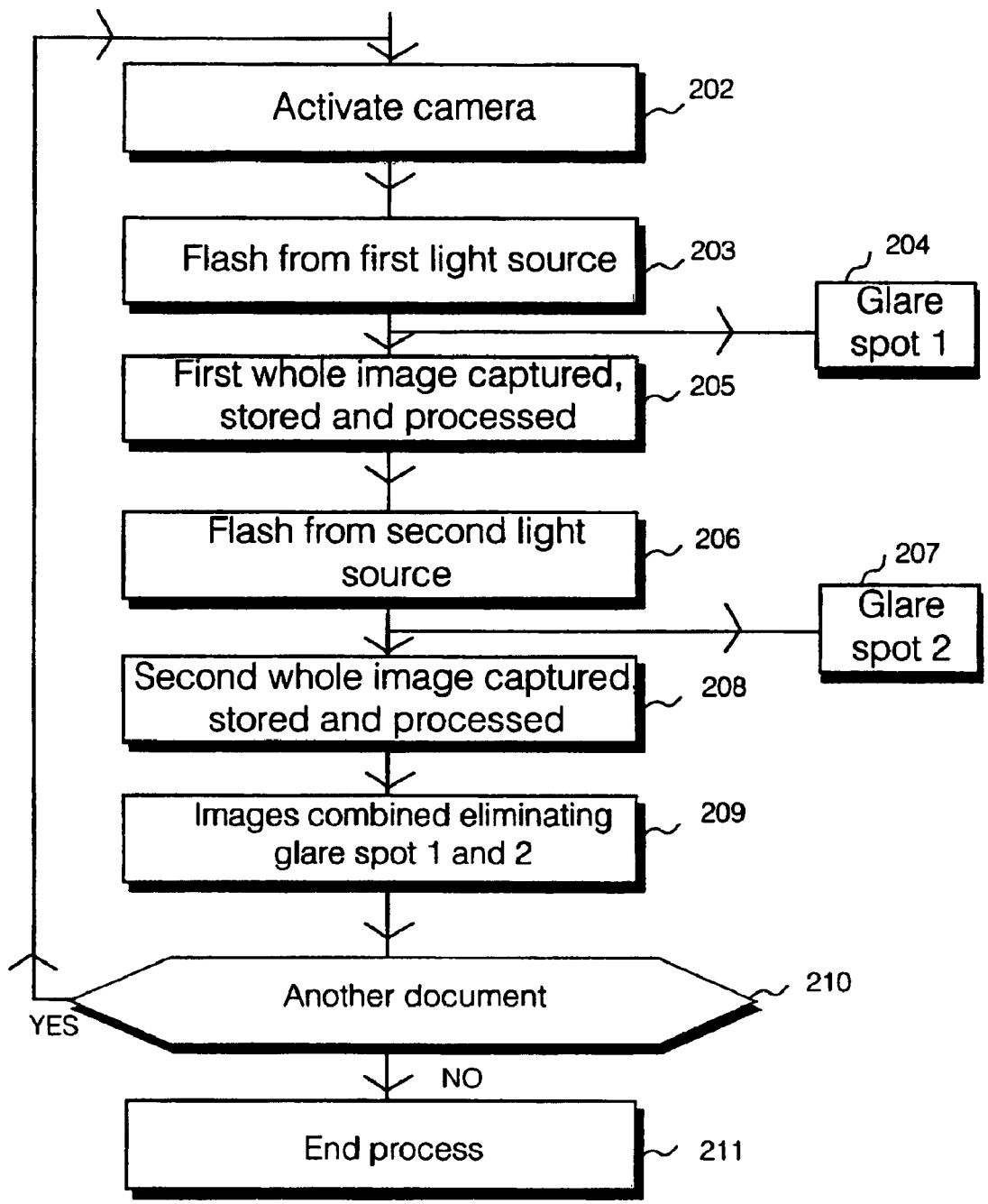
FIG. 2 summarizes the steps of a process with which a digital camera, existing in the prior art, obtains a document image.

FIG. 2 illustrates a prior art process by which a document image is obtained using a digital camera already known to exist in the prior art. The process to obtain a document image begins with the activation of the camera in step 202, typically by a human operator, usually involving the depression of some form of button or switch. This method of activation results in a pulsing signal being sent to the first light source 106 whereby a flash of light from this first light source is emitted in step 203, whereby the document 104, positioned directly below the digital camera 102, is illuminated. Reflected light from the illuminated document is then focused by the lens 105 onto light sensitive nodes contained within the sensing and storing unit 108. In addition to the reflected light incident upon the light sensitive nodes, from the process of Lambertian reflection, additional reflected light is incident upon the light sensitive nodes. This additional light being termed specular reflection is 500 times brighter than the Lambertian reflections and as a result this specular reflection produces a glare spot at step 204 in one half of the document image. Upon capturing the reflected illumination from the document the image is then stored and processed at step 205. At step 206 the second light source 107 is triggered and a flash of light is emitted from this second light source. As with the initial flash of light in step 203, a second glare spot at step 207 is produced following this flash of light from the second source 206, due to the high intensity light generated from the phenomenon of specular reflection. In step 208 the second image containing the glare spot in the remaining half of the document image, is captured stored and processed. In step 209 the document image produced from the flash of light emitted from light source 106 containing glare spot 1, is combined with the image produced from the flash of light from light source 107—this image containing glare spot 2. This process therefore involves the two-fold capture, two-fold storage and two-fold processing of the document images in order to eliminate the problem of glare spot formation inherent in flash light image capture, producing ultimately, a final complete document image generated through Lambertian reflection only, and hence devoid of glare spots. The process ends at step 211 after the camera operator decides not to proceed with further document image capture in the preceding step 210.

Figure 3:
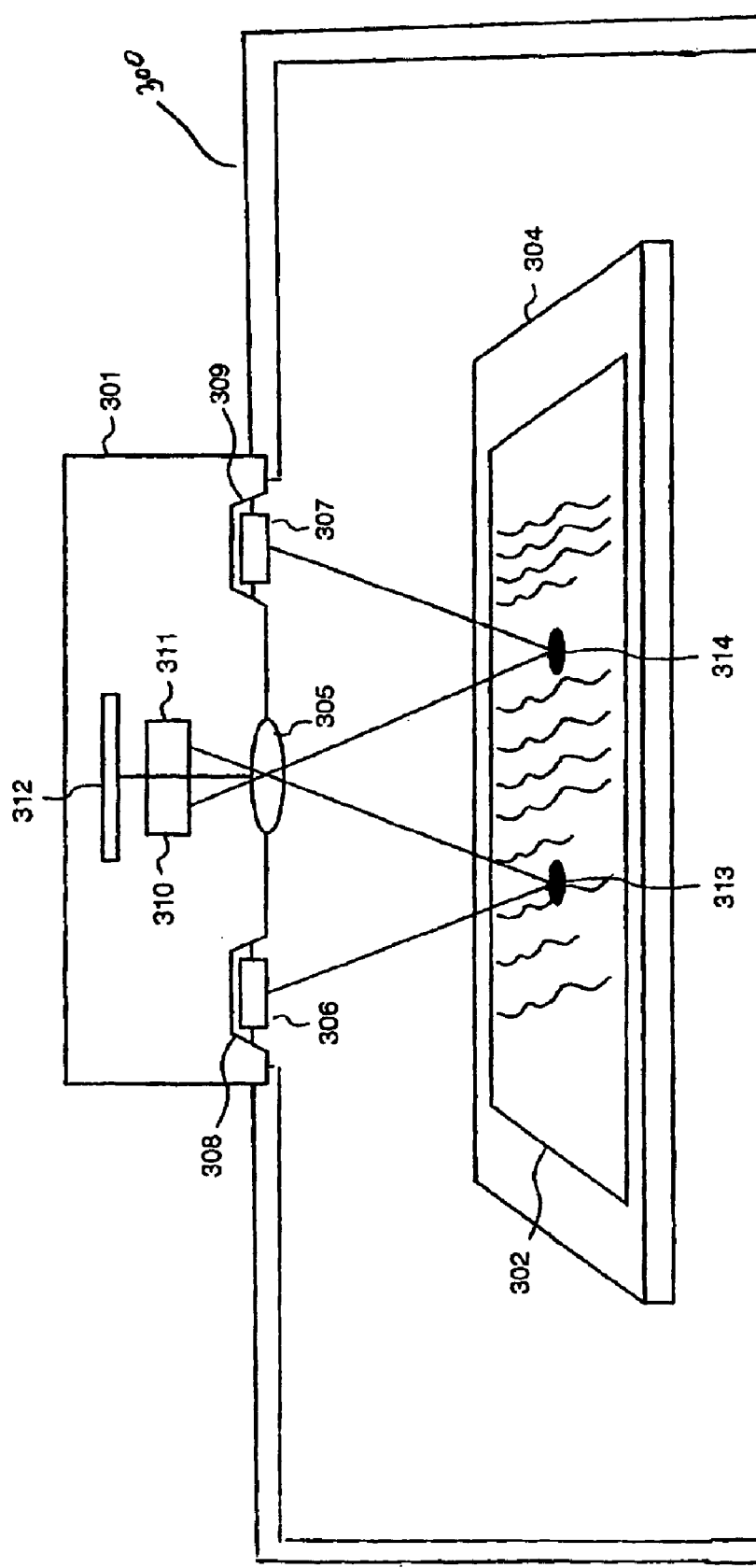
FIG. 3 illustrates a digital camera in operation according to a first specific implementation of the present invention, positioned vertically above a document placed on a flat surface.

FIG. 3 illustrates a digital camera 301 placed directly above a document 302 according to a first specific implementation of the present invention. The digital camera 301 is maintained in a fixed position secured by a stand 300 vertically above the document 302, the document residing on a suitably flat surface 304. The digital camera 301 comprises a lens 305 located on a lower face of the digital camera 301. Also positioned on the lower face of the digital camera are a first light source 306 and a second light source 307 placed diametrically opposite each other on a circle with the imaging lens 305 positioned at the center of the circle. The first light source 306 is positioned within or adjacent to a first reflective region 308 for reflecting light from the first light source, while the second light source 307 is located within or adjacent to a similar second reflective region 309. The digital camera further comprises a sensor unit positioned directly above the lens 305. The sensor unit is divided into first and second sensor regions 310 and 311, the first region 310 being situated closer to the first light source 306 and the second region 311 of the sensor unit being located closer to the second light source 307. The digital camera further comprises a storage or memory bank unit 312 located near to the sensing unit. In operation the digital camera is activated by a human operator or by other activation means. Upon activation, the first light source 306 generates a flash of light thus substantially illuminating a significant amount of the entire document. The reflected illumination from the document 302 comprises light due to Lambertian reflection and light due to specular reflection both types of reflected light pass through the lens 305 and are incident upon the sensor unit. The sensor unit has an electronic shutter which divides the sensor unit into the two regions 310, 311, the two regions of the shutter being able to work independently of one another and can be triggered separately for capture of illumination from each half of the image of the document. The dividing line between the two halves of the sensor unit goes through the center of the image and is perpendicular to a line joining the two light sources. The first and second regions 310 and 311 of the sensing unit are each configured to receive reflected light from a corresponding half of the entire document 303. The electronic shutter for the first region 310 of the sensor unit is activated so that charge on the first sensor region is captured in response to an image of the second region of the document while the second sensor region 311 remains in a 'closed' state so that charge variations on the second sensor region are not captured by the memory bank unit. Specular reflection produced from the flash of light from first light source 306 produces a glare spot 313 in one half of the document image. Reflected light from the Lambertian reflection of the second document region is captured by the sensing unit. First light source 306 is then triggered producing a flash of light thus substantially illuminating a significant amount of the entire document 302.

The states of the activated and non-activated regions of the sensing unit are then reversed thus permitting reflected light from the illuminated document 302 stemming from the triggering of the second light source 307, to be incident upon the exposed second region 311 of the sensing unit. Only Lambertian reflection is received by second sensor region 311, thus eradicating the glare spot 314, generated from the flash of light from the second light source 307, from the captured document image. Substantially half of the document image contained in first sensor region 310 and substantially half of the document image contained in second sensor region 311 can now be extracted from the sensor unit and processed. The first and second light sources 306 and 307 comprise any suitable type of light source. A particular advantage of using flash tubes for the light sources is that due to their short pulse nature, a very short exposure time may be used thus reducing the effects of external light sources.

Figure 4:
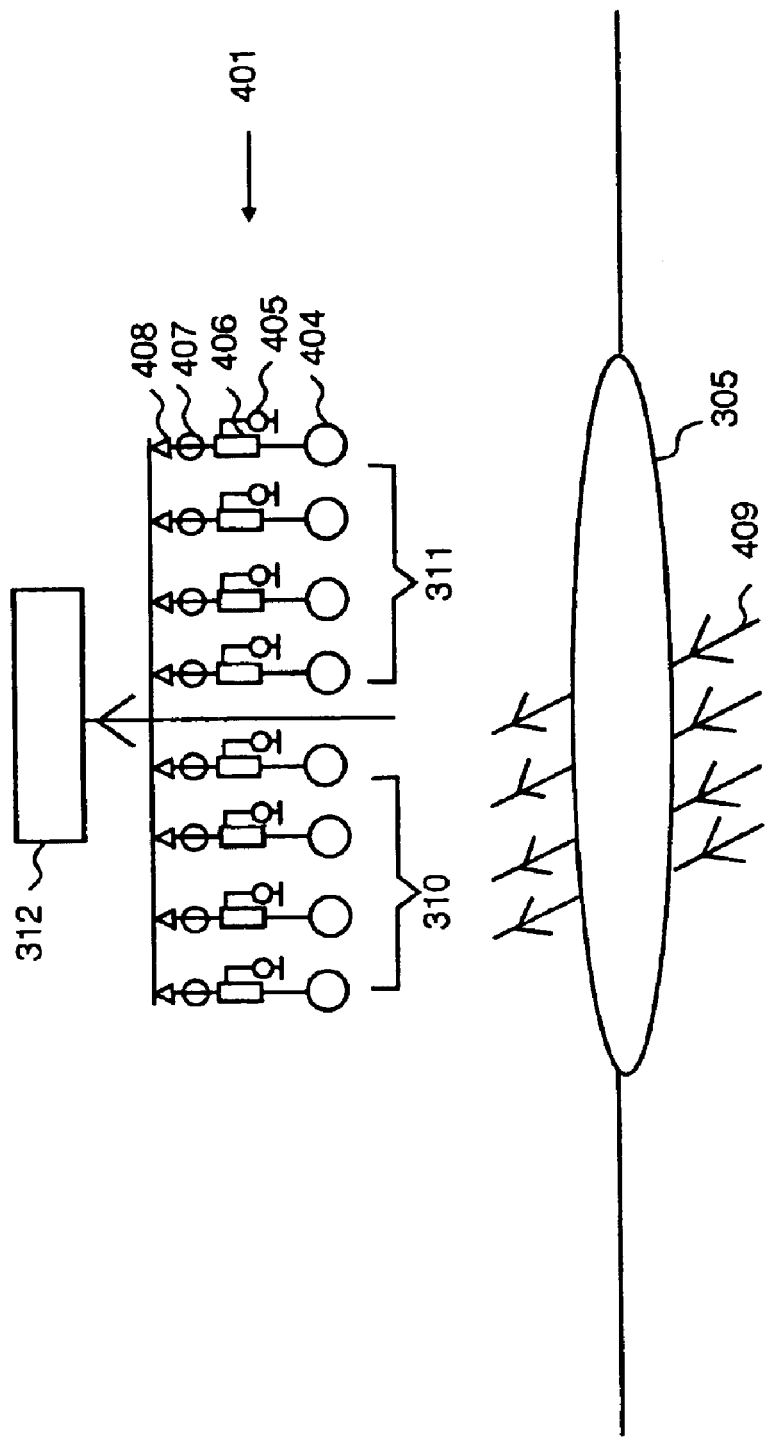
FIG. 4 illustrates the sensor unit of the digital camera of FIG. 3 herein being divided into two regions.

FIG. 4 illustrates in more detail the sensing unit positioned above the lens 305 in the digital camera. The sensing unit 310, 311 is divided into the two distinct sensor regions 310, 311 the division being made perpendicular to a main plane of the lens 305. Each region of the sensing unit 403 comprises a parallel array of nodes, positioned directly above the lens. The array of nodes comprises a plurality of light sensitive elements, for example photodiodes 404, the light sensitive elements being connected permanently to an array of corresponding respective first charge storage elements 406; a first array of control elements 405, for example transistors, which are connected to the first charge storage elements, and which are capable of charging (or discharging) the first charge storage elements 405 to a "reset" charge condition; a second array of storage elements 408 comprising capacitors each capable of storing charge accumulated by a corresponding respective first charge storage element; and an array of a plurality of second control elements 407, each comprising for example a gating transistor, interposed between the corresponding respective first charge storage element 406 and second charge storage element 408. Each light sensitive node comprises a said light sensitive element, a said first and second control element, and a said first and second storage element. The individual second storage elements are connected to the storage memory unit 312 which stores the information contained in the individual charges stored in the second charge storage elements 408 as image data. In operation, reflected illumination from the illuminated document, positioned directly below the digital camera, passes through the lens 305 and is incident upon the array of light sensitive elements 404. Shuttering of the first and second regions of the sensing unit is achieved electronically by the first control elements 405. The shuttering operation works by resetting the charge on each first charge storage element by gating the element using a corresponding gating transistor 405 to deplete the charge from the first charge storage element. This resets the light sensitive elements. The light sensitive elements continue to deplete charge in response to incident light. After a predetermined shutter period has expired, the second control element (gating transistor) 407 conducts the remaining charge on the first storage elements 406 which is transferred to the second charge storage elements 408. The charges in the second charge storage elements are read into the memory device 312 which stores image data.

The period between reset of the first sensor region 310, and gating of the charge from the first storage elements 407 via the second control elements 406 to the second storage elements 408 is timed such that reset of the first storage elements 406 occurs immediately prior to activation of the first light source 306, and gating of the charge from the first storage elements 406 by the second control elements 407 to the second storage elements 408 occurs at a time after the flash of first light source 306. After reset, the photodiode light sensitive elements 404 deplete charge from the first charge storage elements. The period between reset of the first charge storage elements and gating of the charge from the first storage elements to the second storage elements may be optimized to a period around a time when the first light source illuminates, to avoid capture of light other than from reflection of the first light source on the document. Optimization of the period improves image quality.

Figure 5:
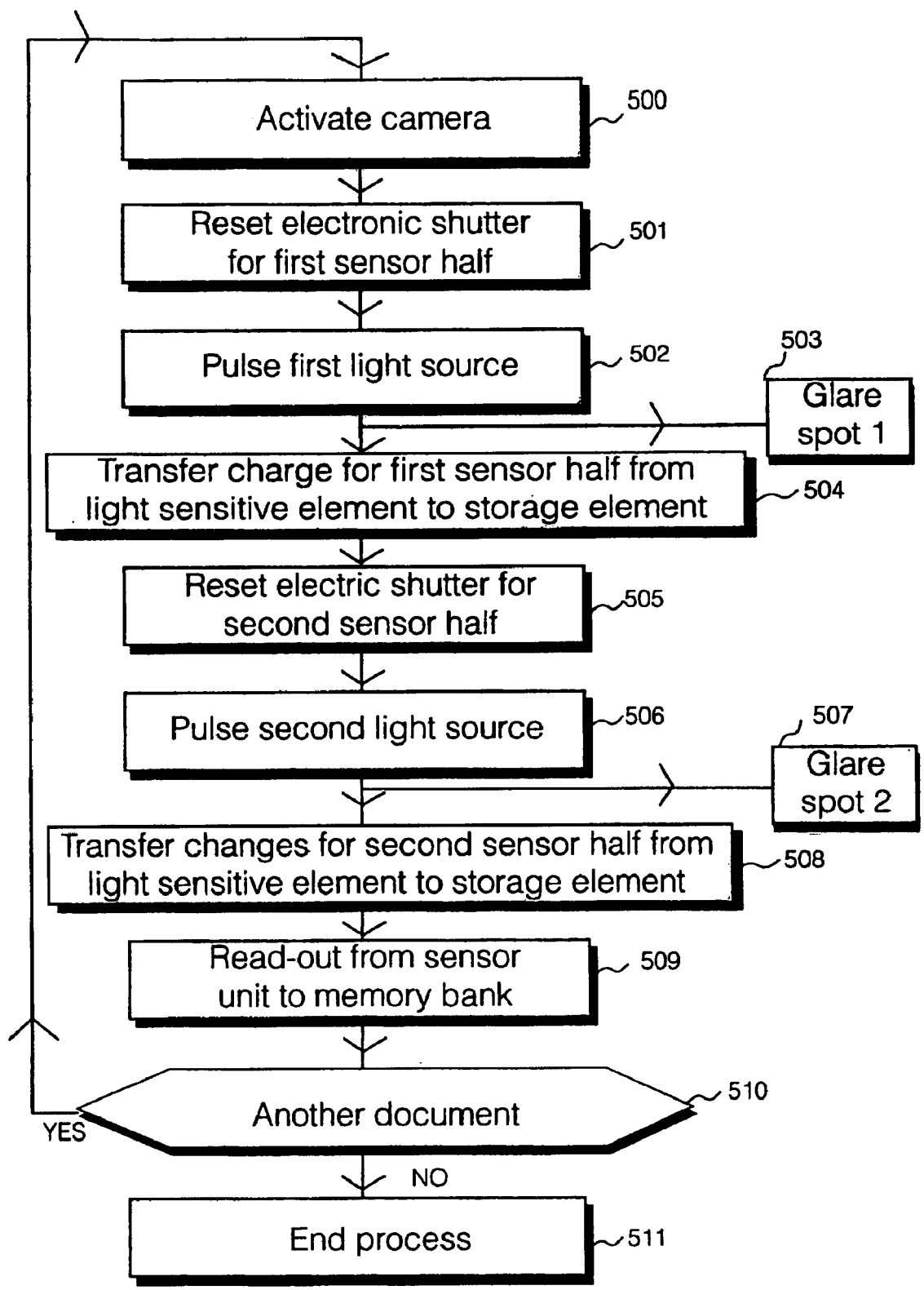
FIG. 5 summarizes the steps required to obtain a document image using a digital camera containing a sensor unit divided into two regions according to a first specific method of the present invention.

FIG. 5 illustrates the steps involved to obtain a document image using a digital camera comprising a sensing unit divided into the two distinct first and second regions 310 and 311. A first step 500 involves the activation of the camera, typically performed by the depression of a button or switch by a human operator or other activation means. At step 501 the first storage elements in first region 310 of the sensing unit are reset. Charge accumulates on the light sensitive elements 404. A flash of light is emitted from first light source 306, thus illuminating the document. The specular reflection produced from the first light source 306 via the document 303 passes through the lens 305 and is incident upon the first portion of the sensing unit which is in an 'open' condition. The flash of light stemming from first light source 306 upon reaching the document 303, produces Lambertian reflection which passes through the lens 305 and is incident upon the exposed light sensitive elements 404 of the first region 310 of the sensor unit. The image captured by the light sensitive elements 404 comprise substantially half of the document 303 this captured image stemming from the Lambertian reflection, not the specular reflection and hence none of the light sensitive elements 404 are exposed to the glare spot 313 produced from the light source 306, stemming from the specular reflection. At step 504 the charges on the first charge storage element 406 within the first region 310 are transferred via the second control transistors 407 to the second storage elements 408. At step 505 to 507 the steps 500 to 504 are repeated, employing the second light source 307, instead of the first light source 306 thus exposing the light sensitive elements 404, within the second region 311 of the sensor unit to the Lambertian reflection only, the second region of the sensor having light sensitive nodes in the 'open' condition. The specular reflection producing the glare spot 314 passes through the lens 305 and is incident upon the first region 310 of light sensors 404, which are now in the 'closed' condition. At step 508 the process is similar to the process described for step 504 involving the transfer of charge from the light sensitive elements 404 to the first storage elements 406. At step 509 the complete image of the document obtained from the combination of images from the first and second pass of the camera is read out from the sensor unit 403 into a suitable memory bank 312. The process ends at step 511 after the camera operator decides at step 510 not to proceed with the acquisition of an image of a further document.

Figure 6:
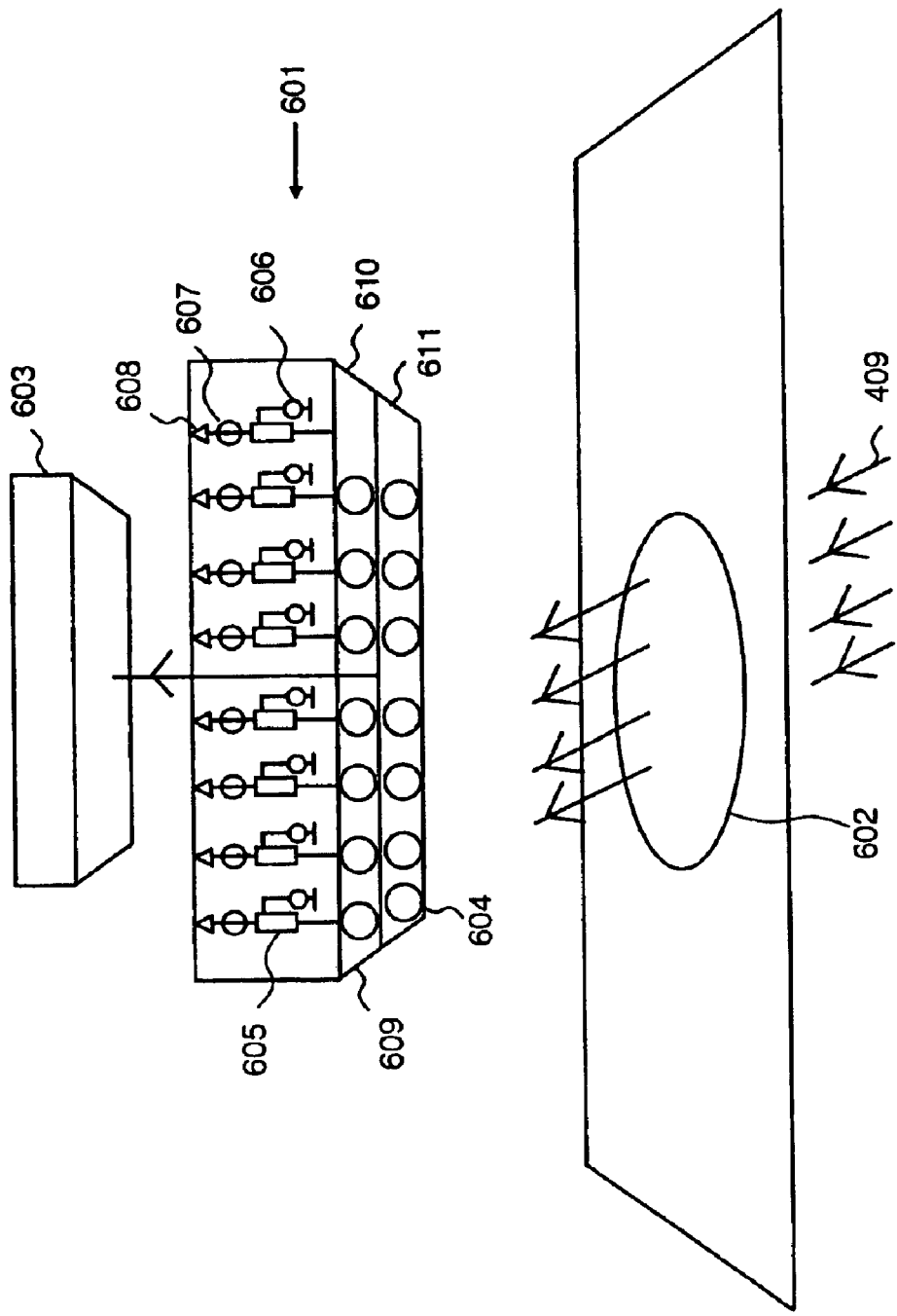
FIG. 6 illustrates the sensor unit of the digital camera of FIG. 3 herein being divided into three regions.

FIG. 6 illustrates a second sensing unit divided into three distinct regions within a digital camera 601. The sensing units of FIG. 4 and FIG. 6 are very similar in that they both illustrate a sensing unit 601 positioned directly above a lens 602, the sensing unit 601 being connected to a storage unit or memory bank 603. In FIG. 6 the sensing unit 601 comprises a plurality of nodes arranged in a substantially parallel array, the array of nodes being substantially perpendicular to a plane of the lens 602. These nodes comprise a plurality of light sensitive elements 604 positioned near to the lens 602, a plurality of first charge storage elements 605 for storing charge; a plurality of first control means 606, for example transistors for resetting the charge on first charge storage elements 604; a plurality of second charge storage elements 608 for storing charge transferred from the plurality of first charge storage elements 605; and a plurality of second control means 607, for example transistors, for transferring charge on the first charge storage elements to the second charge storage elements. A distinct difference between the sensing unit of FIG. 6 compared to that of FIG. 4 is the multiplicity with which the second sensing unit of FIG. 6 is divided. In FIG. 6 the second sensing unit is divided into three distinct sensing regions 609, 610 and 611.

Figure 7:
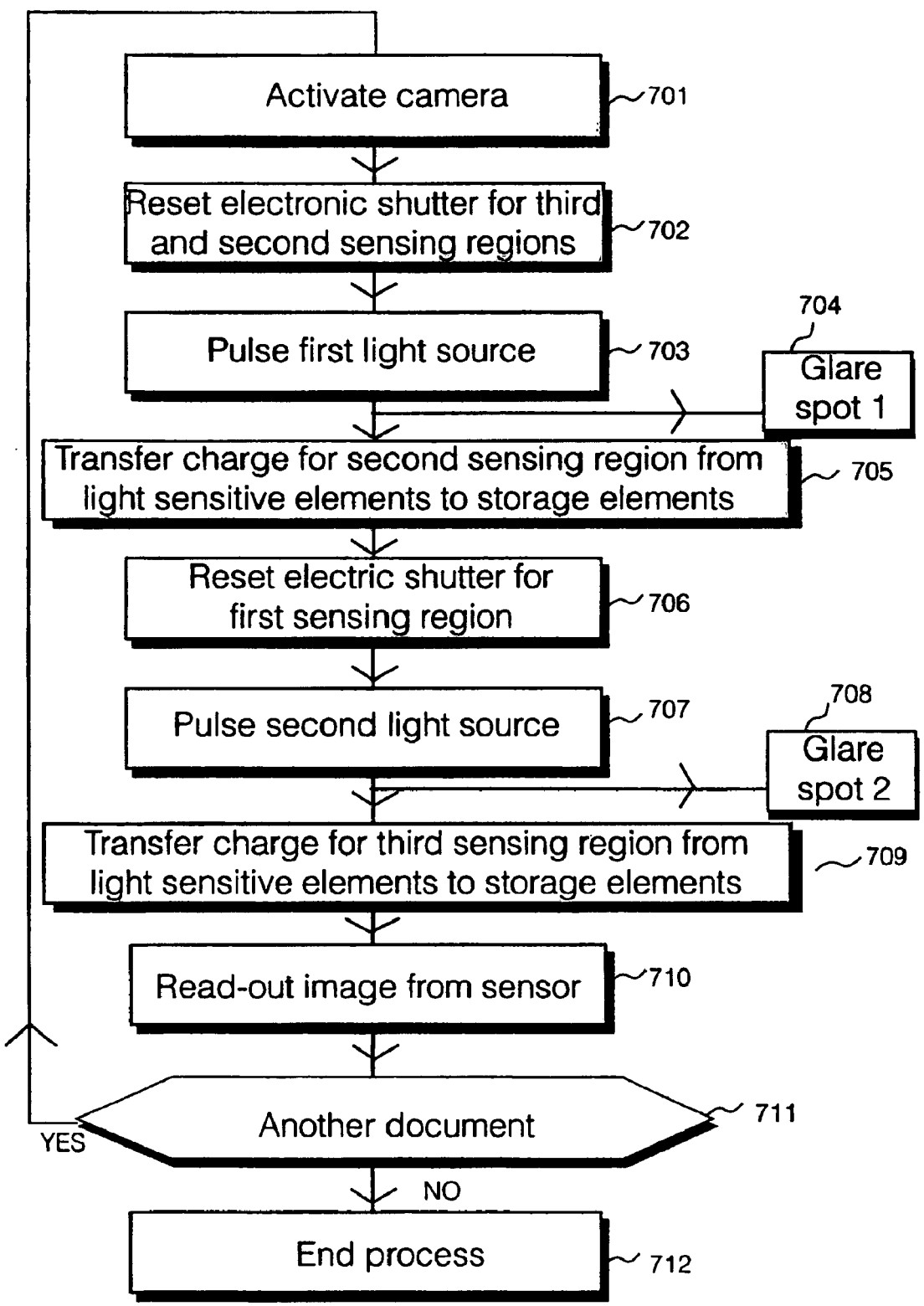
FIG. 7 summarizes the steps involved to obtain an image of a document using a digital camera containing a sensor unit divided into three regions.

FIG. 7 illustrates the steps required to obtain an image of a document employing a digital camera comprising a sensing unit substantially divided into three distinct shuttered regions. At step 701 the camera is activated, typically by depression of an activation means such as a button or switch by a human operator. At step 702 the second and third sensing regions are reset, and the electronic shutters for those regions are opened, thus allowing charge collection in the second and third regions, while the first region of sensors remains 'closed' thus not accumulating charge. At step 703 a flash of light is emitted from a first light source thus illuminating the document, the specular reflection produced from the first light source via the document passes through the lens 603 and is incident upon the 'closed' first sensor region. Thus, through the geometrical arrangement of the sensor unit and the shutters, the glare spot in step 704 is omitted from the image of the document captured by the first sensor unit. Only Lambertian reflection, which passes through the lens 603 is incident upon the second and third sensor regions, thus the image captured by the second sensor region comprises an image of substantially half the document due to the geometrical position of the sensor unit, while the third sensor region receives more illumination with respect to the first or second regions from the entire illuminated document, however the glare spots are not captured by the second or third sensor regions. At step 705 the charge created in the second sensor region is transferred to the storage nodes within the second sensor region 605 via the second control transistors 607. At step 706, the first sensor region is reset, and the electronically shuttered second region 609 is closed. In step 707, a flash of light is then emitted from the light source thus illuminating the document for a second time, the specular reflection produced from the light source and the document passes through the lens 603 and is incident upon the 'closed' second sensor region 607 thus preventing exposure of the second sensor region to the specularly reflected light and hence preventing the creation in the image of a glare spot in the second sensor region in step 708. Lambertian reflection resulting from the flash of light from the light source 307 passes through the lens 305 and is incident upon the exposed first and third sensor regions, this process affecting the charge on the first and third sets of light sensitive elements and eliminating a glare spot from the captured image in those regions at step 708. At step 709 the charge created in the first and third regions due to the reception largely of reflected Lambertian reflection, is transferred to the second storage elements via the second control transistors. At step 710 the images stored in the storage elements within the separate distinct first to third regions, are read-out to the storage unit 312. The process is terminated at step 712 once the operator of the digital camera has decided not to proceed with the acquisition of a subsequent document image in step 711.

In a further embodiment, the digital camera may be provided in a casing having a single flash unit, and being detachable from a stand unit, the stand unit maintaining the detachable digital camera in a fixed orientation above a document bed on which is placed a document. In this arrangement, the digital camera may be detached for use for other purposes, for example photographing scenery. When connected to the specially adapted stand, which contains a second flash unit, the combined camera and stand operates substantially as herein before described with reference to FIG. 3. In this arrangement, the lens and first flash unit are provided within a casing of the separate detachable digital camera, and the second lens unit is provided in a housing mounted to the fixed stand, such that when the detachable digital camera is connected into the stand, operation of the camera by a first illumination, followed by a second illumination resulting in first and second image capture operations as herein before described is achieved. A control mechanism for operation of the digital camera may be built into the digital camera itself, or built into the housing.

What is claimed is:

1. A digital camera configured to obtain an image of a document, said camera comprising:
    a first light source for illuminating said document in a first image capture operation of said camera;
    a second light source for illuminating said document in a second image capture operation of said camera;
    an imaging detector for capturing an image of said document from said first and second image capture operations, said imaging detector being arranged in first and second portions;
    a controller for controlling said imaging detector, said controller being configured to collect an image of only a first portion of said illuminated document during said first image capture operation thereby providing first image data, and to collect an image of only a second portion of said illuminated document during said second image capture operation thereby providing second image data;
    a memory for storing said first and second image data; and
    a processor for processing said first and second image data so as to obtain a final image data of said document produced from said first and second image data.

2. A digital camera as claimed in claim 1, wherein said first portion of said imaging detector and said second portion of said imaging detector constitute part of an integrated image-sensing unit, said unit further comprising a first portion of said memory and a second portion of said memory.

3. A digital camera as claimed in claim 1, wherein said first portion of said imaging detector is coupled to a portion of said memory specifically allocated to said first imaging detector portion.

4. A digital camera as claimed in claim 1, wherein said camera is configured to capture substantially half of said document image in said first image capture operation and capture substantially half of said document image in said second image capture operation.

5. A digital camera as claimed in claim 1, comprising at least one lens wherein illumination from said illuminated document passes through said at least one lens prior to being received by said imaging detector.

6. A digital camera as claimed in claim 5, wherein said imaging detector is positioned substantially above said at least one lens.

7. A digital camera as claimed in claim 1, wherein:
    said imaging detector comprises an array of light-sensitive elements arranged for exposure to illumination from said documents;

said controller comprises an array of gates for gating charge collected by said array of light-sensitive elements; and said memory comprises an array of charge storage elements arranged to receive a plurality of charges from said array of light-sensitive elements, via said gates.

8. A digital camera as claimed in claim 7, wherein:

said imaging detector comprises an array of individual image-sensing elements;

said controller comprises an array of individual control elements; and said memory comprises an array of individual storage elements, wherein each said image-sensing element has a corresponding respective control element and a corresponding respective storage element, the arrangement being such that each said image-sensing element accumulates charge in response to illumination, and said charge is controlled by said corresponding respective control element to be supplied to said corresponding respective storage element, or to be discharged from said image-sensing element other than to said storage element.

9. A digital camera as claimed in claim 1, wherein said portions of said imaging detector are configurable for use independently.

10. A digital camera as claimed in claim 1, wherein said controller is substantially integrated with said imaging detector, said memory, and said first and second light sources.

11. A digital camera as claimed in claim 1, comprising a camera stand for enabling said camera to be maintained in a fixed position above said document.

12. A digital camera as claimed in claim 1, wherein said controller is configurable for use in producing a predetermined delay between said first image capture operation and said second image capture operation.

13. A digital camera as claimed in claim 1, wherein said controller is configurable for use in producing a said first illumination of said document and a said second illumination of said document consecutively, one after the other.

14. A digital camera as claimed in claim 1, wherein said imaging detector is integrated directly in a storage unit or memory bank of the camera.

15. A digital camera as claimed in claim 1, wherein said first light source and said second light source are positioned diametrically opposite each other on a circle, and comprising at least one lens positioned at the centre of said circle.

16. A digital camera configured to obtain an image of a document, said camera comprising:

a first light source for illuminating said document in a first image capture operation of said camera;

a second light source for illuminating said document in a second image capture operation of said camera;

an imaging detector for capturing an image of said document from said first and second image capture operations, said imaging detector being arranged in first and second portions;

a controller for controlling said imaging detector, said controller being configured to collect an image of a first portion of said Illuminated document during said first image capture operation thereby providing first image data, and to collect an image of a second portion of said illuminated document during said second image capture operation thereby providing second image data;

a memory for storing said first and second image data; and a processor for processing said first and second image data so as to obtain a final image data of said document produced from said first and second image data, wherein the light sources and the imaging detector are adapted such that the first portion of said illuminated document does not contain a reflected image of the first light source during the first image capture operations, and the second portion of said illuminated document does not contain a reflected image of the second light source during the second capture operation.

17. A method of obtaining an image of a document using a digital camera, said method comprising the steps of:

illuminating the document in a first image capture operation of said camera;

illuminating the document in a second image capture operation of said camera;

using an imaging detector to capture an image of said document from said image capture operations;

during said image capture, controlling said imaging detector in accordance with the steps of:

exposing only a first portion of said imaging detector to said illuminated document during a first image capture operation to provide first image data;

exposing only a second portion of said imaging detector to said illuminated document during a second image capture operation to provide second image data;

storing said first and second image data; and processing said first and second image data so as to obtain a final image of said document produced from said first and second image data.

18. A method as claimed in claim 17, wherein during said step of image capture, controlling said imaging detector comprises the steps of:

exposing a first portion and a second portion of the imaging detector to said illuminated document during said first image capture operation, said first image capture operation thereby resulting in a first image;

exposing said second portion and a third portion of said imaging detector to said illuminated document during said second image capture operation, said second image capture operation thereby resulting in a second image, said first and second image capture operations resulting in a third image;

storing said first, second and third images; and processing said first and second images so as to obtain a final image of said document.

19. A method as claimed in claim 18, further comprising the steps of:

following said first image capture operation, transferring said first image from said first portion of the imaging detector to a suitable first memory; and following said second image capture operation, transferring said second image from said second portion of the imaging detector to a suitable second memory.

20. A method of obtaining an image of a document using a digital camera, said method comprising the steps of:

illuminating the document in a first image capture operation of said camera;

illuminating the document in a second image capture operation of said camera;

using an imaging detector to capture an image of said document from said image capture operations;

during said image capture, controlling said imaging detector in accordance with the steps of:

exposing a first portion of said imaging detector to said illuminated document during a first image capture operation to provide first image data;

exposing a second portion of said imaging detector to said illuminated document during a second image capture operation to provide second image data, the first and second image capture operations including illuminating the exposed first and second portions by using first and second light sources, respectively;

storing said first and second image data; and processing said first and second image data so as to obtain a final image of said document produced from said first and second image data, wherein during said first image capture operation, the first portion does not contain an image of the first light source, and during said second image capture operation, the second portion does not contain an image of the second light source.

21. A method of obtaining an image of a document using a digital camera, said method comprising the steps of:

illuminating the document in a first image capture operation of said camera;

illuminating the document in a second image capture operation of said camera;

using an imaging detector to capture an image of said document from said image capture operations;

during said image capture, controlling said imaging detector in accordance with the steps of:

exposing a first portion of said imaging detector to said illuminated document during a first image capture operation to provide first image data;

exposing a second portion of said imaging detector to said illuminated document during a second image capture operation to provide second image data, the first and second image capture operations including illuminating the exposed first and second portions by using first and second light sources, respectively;

storing said first and second image data; and processing said first and second image data so as to obtain a final image of said document produced from said first and second image data;

during said step of image capture, controlling said imaging detector by:

(a) exposing a first portion and a second portion of the imaging detector to said illuminated document during said first image capture operation said first image capture operation thereby resulting in a first image;

(b) exposing said second portion and a third portion of said imaging detector to said illuminated document during said second image capture operation said second image capture operation thereby resulting in a second image, said first and second image capture operations resulting in a third image;

(c) storing said first, second and third images; and (d) processing said first and second images so as to obtain a final image of said document;

following said first image capture operation, transferring said first image from said first portion of the imaging detector to a suitable first storage means;

following said second image capture operation, transferring said second image from said second portion of the imaging detector to a suitable second storage means;

transferring said third image from said third portion of said imaging detector to a suitable third storage means; and processing said first, second and third images so as to obtain a final image of said document.

22. A digital imaging apparatus configured to obtain an image of a document, said imaging apparatus comprising a digital camera and a stand adapted to hold said digital camera in a fixed orientation relative to said document, said digital camera comprising:

a first light source for illuminating said document in a first image capture operation;

an imaging detector for capturing an image of said document from said first image capture operation and a second image capture operation, said imaging detector being arranged in first and second portions;

a controller for controlling said imaging detector, said controller being configured to collect an image of a first portion of said illuminated document during said first image capture operation, said first image capture operation thereby resulting in a first image data, and said controller being configured to collect an image of a second portion of said illuminated document during said second image capture operation, said second image capture operation thereby resulting in a second image data;

a memory for storing said first and second image data; and a processor for processing said first and second image data so as to obtain a final image data of said document produced from said first and second image data, wherein said stand comprises a second light source for illuminating said document in said second image capture operation, and said controller is arranged to activate said first and second light sources for illumination of said first and second imaging detector portions.

23. A digital imaging apparatus as claimed in claim 22, wherein the light sources and the imaging detector are adapted such that the first portion does not contain a reflected image of the first light source, and the second portion does not contain a reflected image of the second light source.

24. A method of capturing an image comprising:

sequentially illuminating the image with optical energy from first and second directions, the image responding to the illumination by reflecting the image, detecting only a first portion of the reflected image at a first image-sensing region in response to the image being illuminated from the first direction, detecting only a second portion of the reflected image at a second image-sensing region in response to the image being illuminated from the second direction, the first and second image-sensing regions differing from each other, and combining the detected first and second reflected image portions so the combined first and second reflected image portions are in substantially the same spatial relationship as the image, the first and second directions, the first and second image-sensing regions, and the combining step being such that specular reflection from the image is not present in the combined image.

25. A method as claimed in claim 24, wherein the first and second image-sensing regions are on opposite sides of an optical axis intersecting the image and the first and second directions are on opposite sides of the optical axis, the detecting step of only the first portion of the reflected image being performed only while the image is illuminated from the first direction, and the detecting step of only the second portion of the reflected image being performed only while the image is illuminated from the second direction.

26. A method as claimed in claim 25, wherein the first and second image-sensing regions include optical to electric transducers, and the combining step is performed by transferring to a memory electric energy derived only by the electric transducers of the first image-sensing region in response to reflected optical energy of the image being incident on the first image-sensing region and by transferring to the memory electric energy derived only by the electric transducers of the second image-sensing region in response to reflected optical energy of the image being incident on the second image-sensing region.

27. A method as claimed in claim 24, wherein the first and second image-sensing regions include optical to electric transducers, and the combining step is performed by transferring to a memory electric energy derived only by the electric transducers of the first image-sensing region in response to reflected optical energy of the image being incident on the first image-sensing region and by transferring to the memory electric energy derived only by the electric transducers of the second image-sensing region in response to reflected optical energy of the image being incident on the second image-sensing region.

28. A method as claimed in claim 27, wherein the electric energy is transferred to the memory by controlling, in response to the optical energy incident on the optical to electric transducers, charge on first charge storage elements respectively associated with the optical to electric transducers and then controlling, in response to the charge on the first charge storage elements, charge on second charge storage elements respectively associated with the first charge storage elements.

29. A method as claimed in claim 27, wherein the electric energy is transferred to the memory by controlling, in response to the optical energy incident on the optical to electric transducers, charge on charge storage elements respectively associated with the optical to electric transducers.

30. Apparatus for capturing an image comprising:
an optical energy source arrangement for sequentially illuminating the image with optical energy from first and second directions,
first and second image-sensing regions at different locations,
a controller for causing (a) only the first image-sensing region to be adapted to detect a first portion of the reflected image in response to the image being illuminated from the first direction, and (b) only the second image-sensing region to be adapted to detect a second portion of the reflected image in response to the image being illuminated from the second direction, and
a combiner for the images adapted to be detected by the first and second image-sensing regions, the combiner being arranged so the combined image from the first and second image-sensing regions are in substantially the same spatial relationship as the image, the first and second directions, the first and second image-sensing regions, and the combiner being such that specular reflection from the image is not present in the combined image.

31. An apparatus as claimed in claim 30, wherein the optical energy source arrangement includes first and second optical sources located on opposite sides of the first and second image-sensing regions.

32. An apparatus as claimed in claim 31, wherein the first and second image-sensing regions have abutting edges, and the first and second optical sources are equally spaced from the abutting edges.

33. An apparatus as claimed in claim 32, further including a lens having an optical axis intersecting the abutting edges so that the first and second image-sensing regions are respectively on first and second opposite sides of the optical axis, the first and second optical sources being respectively on the first and second opposite sides of the optical axis.

34. An apparatus as claimed in claim 33, wherein the controller is arranged for preventing detection of the second portion of the detected image by the image-sensing region on the first side of the optical axis and for preventing detection of the first portion of the detected image by the image-sensing region on the second side of the optical axis.

35. An apparatus as claimed in claim 30, wherein the first and second image-sensing regions are respectively on first and second opposite sides of an optical axis, the first and second optical sources being respectively on the first and second opposite sides of the optical axis, the controller being arranged for preventing detection of the second portion of the detected image by the image-sensing region on the first side of the optical axis and for preventing detection of the first portion of the detected image by the image-sensing region on the second side of the optical axis.

36. An apparatus as claimed in claim 35, wherein the first and second image-sensing regions include optical to electric transducers, and the combiner includes a memory for storing electric energy derived (a) in response to electric signals derived only by the electric transducers of the first image-sensing region being responsive to reflected optical energy of the image incident on the first image-sensing region, and (b) in response to electric signals derived only by the electric transducers of the second image-sensing region being responsive to reflected optical energy of the image incident on the second image-sensing region.

37. An apparatus as claimed in claim 30, wherein the first and second image-sensing regions include optical to electric transducers, and the combiner includes a memory, the controller being arranged for transferring to the memory electric energy derived only by the electric transducers of the first image-sensing region in response to reflected optical energy of the image being incident on the first image-sensing region and by transferring to the memory electric energy derived only by the electric transducers of the second image-sensing region in response to reflected optical energy of the image being incident on the second image-sensing region.

38. An apparatus as claimed in claim 37, wherein the controller includes first and second charge storage elements, the first charge storage elements being respectively associated with the optical to electric transducers, the optical to electric transducers being coupled with the first charge storage elements for causing the optical energy incident on the optical to electric transducers to control the charge stored on the first charge storage elements, the second charge storage elements being respectively associated with the first charge storage elements, the first charge storage elements being coupled with the second charge storage elements for causing the charge stored on the first charge storage elements to control the charge stored on the second charge storage elements.

39. An apparatus as claimed in claim 37, wherein the controller includes charge storage elements, the charge storage elements being respectively associated with the optical to electric transducers, the optical to electric transducers being coupled with the charge storage elements for causing the optical energy incident on the optical to electric transducers to control the charge stored on the charge storage elements.

40. Apparatus for capturing an image, the apparatus comprising:

an optical axis, a first image-sensing region only on a first side of the optical axis, a second image-sensing region only on a second side of the optical axis, first and second optical sources for sequentially illuminating the image and causing derivation of first and second reflected images in response to activation of the apparatus, the first and second optical sources being respectively located on the first and second sides of the optical axis, a controller for enabling (a) only the first sensing region to be responsive to the reflected image adapted to be derived in response to the first optical source being activated, and (b) only the second image-sensing region to be responsive to the reflected image adapted to be derived in response to the second optical source being activated, and a combiner for the images adapted to be detected by the first and second image-sensing regions, the combiner being arranged so the combined image from the first and second image-sensing regions are in substantially the same spatial relationship as the image.

41. An apparatus as claimed in claim 40, wherein the first and second image-sensing regions have abutting edges coincident with the optical axis, and the first and second optical sources are equally spaced from the abutting edges.

42. An apparatus as claimed in claim 40, wherein the first and second image-sensing regions include optical to electric transducers, and the combiner includes a memory for storing electric energy derived (a) in response to electric signals derived only by the electric transducers of the first image-sensing region being responsive to reflected optical energy of the image incident on the first image-sensing region, and (b) in response to electric signals derived only by the electric transducers of the second image-sensing region being responsive to reflected optical energy of the image incident on the second image-sensing region.

43. An apparatus as claimed in claim 42, wherein the controller includes first and second charge storage elements, the first charge storage elements being respectively associated with the optical to electric transducers, the optical to electric transducers being coupled with the first charge storage elements for causing the optical energy incident on the optical to electric transducers to control the charge stored on the first charge storage elements, the second charge storage elements being respectively associated with the first charge storage elements, the first charge storage elements being coupled with the second charge storage elements for causing the charge stored on the first charge storage elements to control the charge stored on the second charge storage elements.

44. An apparatus as claimed in claim 42, wherein the controller includes charge storage elements, the charge storage elements being respectively associated with the optical to electric transducers, the optical to electric transducers being coupled with the charge storage elements for causing the optical energy incident on the optical to electric transducers to control the charge stored on the charge storage elements.

* * * * *